July 23, 1968 W. W. WILSON 3,393,440
APPARATUS FOR APPLYING O-RINGS
Filed Aug. 1, 1966 2 Sheets-Sheet 1
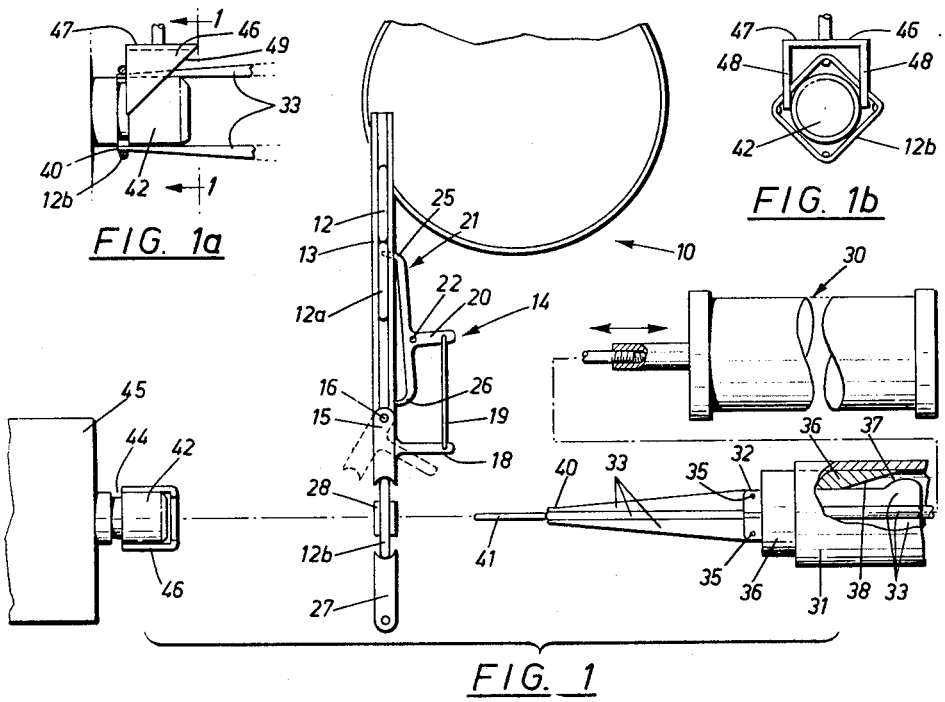
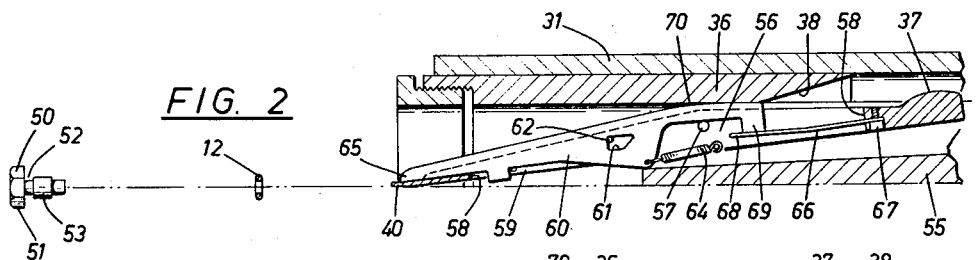
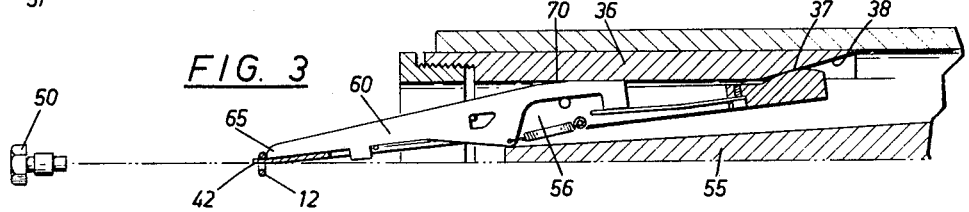
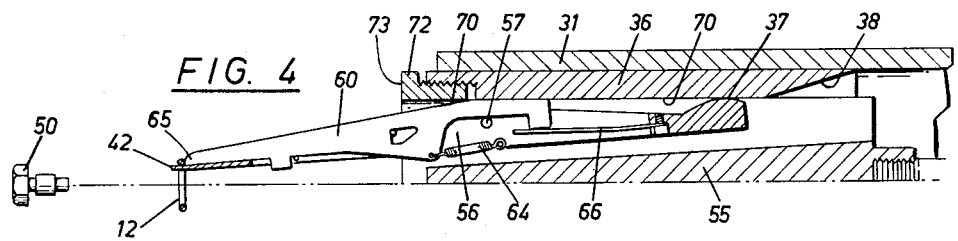

United States Patent Office 3,393,440
Patented July 23, 1968

3,393,440
APPARATUS FOR APPLYING O-RINGS
Wilfred W. Wilson, Woodbridge, Ontario, Canada, assignor to The Amara Company Limited, Rexdale, Ontario, Canada
Filed Aug. 1, 1966, Ser. No. 569,344
18 Claims. (Cl. 29—235)

ABSTRACT OF THE DISCLOSURE

Apparatus for expanding and placing a resilient ring at a desired location around a workpiece. A plurality of quills are pivotally mounted on a carriage aligned with a workpiece. As the carriage moves, the end of the quills engage the ring and cam means urge the quills outward expanding the ring as it is carried to a desired location around the workpiece. Then the ring is stripped off of the quills onto the workpiece.

---

This invention relates to apparatus for applying O-rings to articles.

In industries where O-rings are used in large quantities for seals in one or more of their components, many hazards occur when they are fitted by hand or hand-operated jigs.

Fitting O-rings over threads, sharp corners, keyways, slots and holes has often resulted in post-sale service, and costly warranty replacement of whole pieces of equipment. A hidden problem often missed by visual inspection is the twisting of small cross-sectional diameter rings which is responsible for many low pressure leaks.

One object of this invention is to provide a machine for applying O-rings to articles which avoids many of the disadvantages of the prior art equipment which has been used for this purpose.

Accordingly, this invention provides a mechanism for axially displacing a resilient annulus, such as an O-ring, while radially spreading it, and for releasing the spread and displaced annulus at a predetermined location, said mechanism comprising a quill carriage, guideway means along which said carriage is rectilinearly reciprocable, means for reciprocating said quill carriage, at least three quills pivotally mounted upon said quill carriage and each having a tip projecting forwardly of said quill carriage, the quills being biased to bring their tips together such that upon initial forward movement of the carriage, the tips can simultaneously enter a resilient annulus aligned axially with the direction of reciprocation, cam means between each quill and said guideway means operable upon further movement of the carriage in said forward direction to pivot the quills such that the tips are displaced radially outwardly to engage and to spread the annulus while displacing it in said forward direction, and release means actuable at the end of movement of said tips in said forward direction to strip the spread annulus from said tips.

Three embodiments of this invention are illustrated in the accompanying drawings, in which like numerals refer to like parts throughout the several views, and in which:

FIGURE 1 is a plan view, somewhat schematic in nature, of one embodiment of the apparatus of this invention;

FIGURE 1a is an elevational view of a portion of the apparatus of FIGURE 1;

FIGURE 1b is an axial view of the portion shown in FIGURE 1a, from the line 1—1;

FIGURES 2, 3, 4, 5 and 6 are sequential views of an axial section of a second embodiment of the apparatus of this invention, showing the operation thereof.

Figure 5:
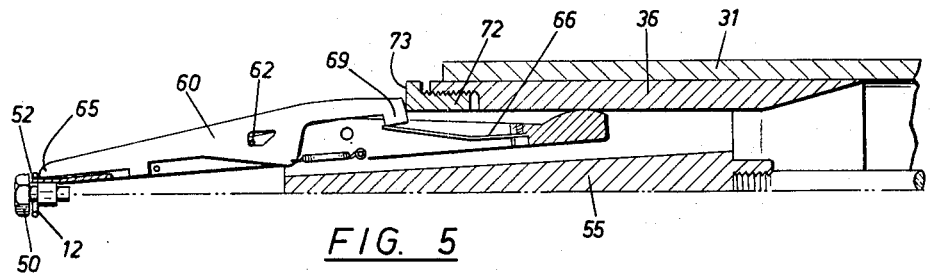

Referring to FIGURE 1, there is shown an O-ring feeder 10 of a type that is in continuous rotation, and which is supplied with O-rings from a conventional hopper (not shown). The O-ring feeder 10 is of conventional design, and delivers properly oriented O-rings 12 to a feed chute 13, which is kept constantly full.

Associated with the feed chute 13 is an escapement mechanism 14, which permits delivery of one O-ring per cycle through a break-away gate 15 located at the outlet of the feed chute 13. The break-away gate 15 is pivoted at 16 on the feed chute 13 and is provided with an arm 18. Pivotally mounted on the arm 18 and constituting a part of the escapement mechanism 14 is a connecting arm 19 that is pivotally connected to a lever 20 forming part of a fork 21 which is pivoted to oscillate about the point 22. When the break-away gate 15 is in the solid-line position in FIGURE 1, the upper finger 25 of the fork 21 extends into the feed chute 13 to trap the O-ring 12a as shown, thus preventing the O-ring behind or upstream of the O-ring 12a from travelling forward along the feed chute 13. However, when the break-away gate 15 moves to the position shown in dotted lines in FIGURE 1, the finger 25 is withdrawn from the feed chute 13, and the finger 26 enters the feed chute to arrest the O-ring 12a, which will now have progressed a distance approximately equal to its diameter.

The break-away gate 15 is spring biased into its solid-line position, such that when it returns from the dotted-line position to the solid-line position, the fork 2 reverts to the position shown in FIGURE 1, arresting the next rearward O-ring on the finger 25, and letting the O-ring 12a pass down through the break-away gate 15 to the position shown as 12b in FIGURE 1. This alternation continues, and feeds one O-ring through the break-away gate each time the latter returns to the solid-line position.

Two other break-away gates 27 and 28 are provided and are arranged to pivot about points remote from the O-ring 12b which sits on break-away gate 28. As may be seen by reference to FIGURE 1, the break-away gates 15, 27 and 28 hold the O-ring 12b in a vertical upstanding position. The break-away gates are adjustable to permit accommodation of O-rings of different sizes.

As best seen in FIGURE 1, there is provided a thrust cylinder 30 into which air or hydraulic fluid may be introduced. Thrust cylinder 30 is mounted in fixed relation to a quill housing 31 which is fixed in position. The introduction of a suitable fluid into the cylinder 30 under pressure causes a quill carriage 32 to move forwardly (leftwardly in FIGURE 1) towards the O-ring 12b held by the break-away gates 15, 27 and 28.

For individual quills 33 (of which three only are visible in FIGURE 1), spaced at 90 degrees with respect to each other, are pivoted to the quill carriage 32 by means of pivot pins 35. The quills 33 extend into a cam sleeve 36, and the rearward end 37 of each quill is adapted to engage the inner, substantially conical cam surface 38 of the cam sleeve 36. The cam sleeve 36 is fixed in position with respect to the quill housing 31. As the quill carriage 32 is moved forwardly towards the O-ring 12b, the rearward end 37 of the quills engages the inner cam surface 38 of the cam sleeve 36, causing the quills 33 to pivot about the pins 35 in such a way that the tips 40 of the quills open or spread radially outwardly. An ejection pin 41 is provided centrally of the quills 33 and is spring loaded to the forward limit position shown in FIGURE 1. The camming action is such that when the quills 33 reach the break-away gates 15, 27 and 28, they have not pivoted outwardly so far as to prevent them from passing through the circular opening in the O-ring 12b.

As the quills 33 pass through this opening in the O-ring 12b held by the break-away gates, they eventually engage the inner surface of the O-ring, and gates 15, 27 and 28 "break away," that is, the gates move or pivot in the direction of travel of the quill carriage 32 to ensure a smooth, scratch-free pick-up of the O-ring 12b, and also to provide passage for the now expanded quills 33.

As the quills 33 move forwardly past the gates 15, 27 and 28 towards the object 42 on which the O-ring 12b is to be fitted, the quills 33 pivot further and cause the O-ring 12b to expand into a square configuration large enough to pass over the initial portion of the object 42, as shown in FIGURE 1b. The object to which the O-ring 12b is to be fitted is shown as a cylinder having an annular groove 44 in which the O-ring 12b is to be seated. The object 42 is held firmly in position in a chuck 45 of conventional design.

The primary distinction between the three embodiments of this invention resides in the release means actuable, upon termination of movement of the tips 40 in the forward direction, to strip the O-ring 12b from the tips 40. In the embodiment under discussion (that shown in FIGURE 1), the release means involves a stripper dog 46, of which three mutually perpendicular views are shown in FIGURES 1, 1a and 1b. The stripper dog 46 consists of a top plate 47, from opposite sides of which downwardly depend two parallel side walls 48 of triangular shape. It will be noted that each side wall 48 has a long, upwardly and rearwardly sloping bottom edge 49 (see FIGURE 1a). The lower corner of each of the side walls 48 is positioned so as to interfere with the passage of the stretched O-ring 12b as the latter passes over the initial portion of the part 42. This interference is clearly shown in FIGURE 1b.

As the quills 33 move the O-ring 12b past the stripper dog 46, the two portions of the O-ring that interfere with the stripper dog 46 ride on and are forced inwardly by the edges 49 to permit the expanded O-ring 12b to pass beyond the stripper dog 46. Of course, at this point, the O-ring 12b has been expanded sufficiently to pass over the initial portion of the object 42. The ejection pin 41 engages the object 42, and the spring biasing the ejection pin 41 forwardly is compressed as the expanded O-ring is carried forward to its index position slightly beyond the groove 44, at which point the O-ring is clear of the stripper dog 46, and assumes the shape shown in FIGURE 1b.

At this stage in the cycle, a forward limit pilot valve (not shown), the operation of which may be initiated by the compression of the spring biasing the ejection pin 41 forwardly, initiates the return stroke of the quill carriage 32. At the beginning of the return stroke, the stripper dog 46 strips the O-ring 12b from the tips 40 of the quills 33, and the O-ring 12b snaps into the groove 44. As mentioned above, once the expanded O-ring 12b has been moved beyond the stripper dog 46, it will return to the configuration shown in FIGURE 1b, so that portions of the O-ring 12b will be engaged by the vertical edges of the downwardly depending side walls 48 of the stripper dog 46 when the quill carriage 32 is retracted, causing the expanded O-ring 12b to be stripped off the tips 40 of the quills 33.

At the same time as the return stroke of the quill carriage 32 is initiated, conventional means may be actuated to loosen the clamping means engaging the object 42 and holding it in position, thereby permitting the now spring loaded ejector pin 41 to eject the object 42 leftwardly from the chuck 45.

As the quill carriage 32 is retracted and returns to its initial position shown in FIGURE 1, the break-away gates 15, 27 and 28 close, and the fork 21 permits another O-ring to pass down through the break-away gate 15 and into position for the next successive cycle, initiated by a reverse limit pilot valve (not shown).

If desired, the object 42 may be held in the chuck 45 for a sufficient time to permit other operations to take place, such as drilling or tapping, before it is ejected by the ejection pin 41. Furthermore, it will be appreciated that manual rather than automatic feeding of O-rings 12 may be employed.

Attention is now directed to FIGURES 2, 3, 4, 5 and 6, with the help of which the second embodiment of this invention will be described. For this second embodiment, the O-ring feeder 10, the feed chute 13 and the break-away gates 15, 27 and 28, and the associated escapement mechanism 14, all remain basically unchanged. Although the O-ring shown in FIGURES 2 to 6 is smaller, in its unstressed condition, than the O-ring shown in FIGURE 1, this is not to suggest that the second embodiment is more suited to small O-rings than is the first embodiment; nor is the reverse true. All of the embodiments of this invention may be adapted to any size of O-ring whatever.

In FIGURES 2 to 6, the part 50 upon which the O-ring 12 is to be fitted, includes a faceted head 51, an annular groove 52, and a portion 53 to the right of the groove 52. The O-ring 12 is intended to be lodged in the annular groove 52.

In FIGURE 2, the quill housing 31 and the cam sleeve 36 are basically identical to the like-named parts in FIGURE 1. The quill assembly in FIGURE 2 includes a quill carriage 55 to which each quill 56 is pivotally connected at 57. The quill 56 in FIGURE 2 has an internal, longitudinal slot 59 in the plane of its pivotal motion, the edges of the slot being shown at 58. The quill 56 has been sectioned along its mid-line, and this is the reason why the forward tip 40 and the rearward end 37 of the quill 56 are shown hatched. The longitudinal slot 59 in the quill 56 houses a stripper member 60, which is mounted on the quill for limited movement with respect thereto. The movement of the stripper member 60 with respect to the quill 56 is determined by the shape of a cam-hole 61 in the stripper member 60, through which cam-hole a pin 62 passes and is secured at both ends to the quill 56. The stripper member 60 is thus capable of limited axial movement, limited radial movement, and of limited pivotal movement with respect to the quill 56. The stripper member 60 is resiliently rearwardly biased by a tension coil spring 64 into a rearward limit position achieved when the pin 62 lodges in the upper left-hand corner of the cam-hole 61. The coil spring 64 is attached at its right-hand end to the quill 56, and at its left-hand end to the stripper member 60. Because of the relative orientations of the pin 62, and the two connection points for the coil spring 64, the latter tends to pivot the stripper member 60 about the pin 62 in a counter-clockwise direction as seen in FIGURE 2. That is, the action of the coil spring 64 tends to bring the forward portion 65 of the stripper 60 into contact with the tip 40 of the quill 56. It is to be noted that the forward portion 65 of the stripper member 60, when the latter is in the rearward limit position urged upon it by the coil spring 64, is located just rearwardly of, and radially outwardly adjacent, the forward portion of the tip 40 of the quill 56.

Another factor tending to rotate the stripper member 60 in a counter-clockwise direction about the pin 62 is a flat spring 66 rigidly secured at its right-hand end to the rearward portion of the quill 56 by a threaded member 67, and bent such that its left-hand end 68 urges upwardly against an appendage 69 at the rearward end of the stripper member 60. A rounded profile at 70 on the stripper member 60 tends to enhance the counter-clockwise urging effect of the flat spring 66.

FIGURE 2 shows the position of the quill 56 and its associated stripper member 60 in the rearmost position of reciprocal motion which the quill undergoes. FIGURE 3 shows the quill 56 and stripper member 60 after an initial portion of the forward motion has been traversed. In FIGURE 3, the rearward end 37 has just come into contact with the conical cam surface 38 of the cam sleeve 36. The quill 56 and the stripper member 60 remain in the same relative position as that of FIGURE 2. It will be seen that the tip 40 of the quill 56 has just entered the centre of the O-ring 12.

FIGURE 4 shows the next sequential position in the forward movement, in which the quill has progressed far enough that the cam follower 37 has traversed the conical surface 38, and is in contact with the cylindrical surface 70 of the cam sleeve 36. During progression of the cam follower 37 down the cam surface 38, the quill 56 has pivoted clockwise about the pivot pin 57, thereby spreading the O-ring 12 radially outwardly. Naturally, all of the quills and their associated cam followers 60 behave in unison. It will be noted that the O-ring 12 has been axially displaced to the left at the same time as it is being radially spread.

It will be observed that the cam sleeve 36, at its left-hand end, is internally threaded to threadedly receive an annular collar 72 having an abutment face 73 at its left-hand end. The annular collar 72 can be axially adjusted with respect to the cam sleeve 36 by manual rotation. The importance of the annular collar 72 in this embodiment is best illustrated with reference to FIGURES 5 and 6, to which attention is directed.

Figure 6:
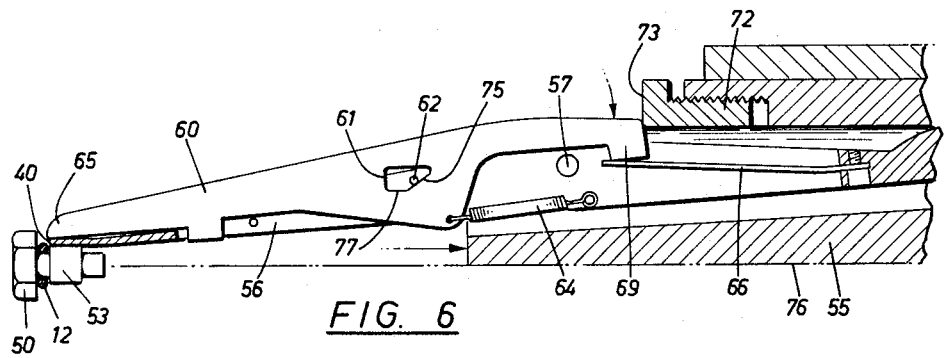

In FIGURE 5, the quill carriage 55 has attained its leftward or forward limit position, again determined by limit switches which are well known in the art, and it will be seen that the O-ring 12 is now positioned exactly over the groove 52 in the part 50. It also will be noted however, that the rearward face of the appendage 69 of the stripper member 60 has slid forwardly past the abutment face 73 of the annnular collar 72, and has been forced radially outwardly beyond the annular collar 72 by the flat spring 66. In this position, the abutment face 73 constitutes a kind of stop means which, as will be explained, delays rearward movement of the stripper member 60 until the quill carriage 55 has completed at least part of its rearward travel. Referring now to FIGURE 6, which shows the condition after only a fraction of an inch of rearward travel from the forward limit position, it will be seen that the tip 40 of the quill 56 has withdrawn rearwardly far enough so as no longer to cover the groove 52 in the part 50. The stripper member 60, however, because of its abutment against the face 73, has remained in exactly the same axial position as it was in at the forward limit shown in FIGURE 5. This means that the forward portion 65 of the stripper member 60 engages the O-ring 12 and strips it from the tips 40, as will be readily understood from FIGURE 6. At the same time as the forward portion 65 of the stripper member 60 is stripping the O-ring 12 from the tips 40, the pin 62, which is secured to the quill 56, moves rear wardly along the lower edge of the cam-hole 61. It will be seen that the irregular shape of the cam-hole 61 includes a sloping portion 75, and that, in the position of FIGURE 6, the pin 62 has begun to engage the sloping portion 75 of the cam-hole 61. It will be appreciated, of course, that the path of the pin 62, relative to the quill housing 31 and the cam sleeve 36, is a straight line parallel to the axis 76 of elements 31 and 36. For this reason, passage of the pin 62 along the slightly sloping bottom edge 77 of the cam-hole 61, and its subsequent passage along the edge 75 will cause the appendage 69 at the the rear of the stripper member 60 to move radially inwardly. When the pin 62 has arrived at the right-hand extremity of the edge 75 (the edge 75, of course, moving radially inwardly beneath it), the appendage 69 will have been urged within the central bore of the annular collar 72, permitting the coil spring 64 to snap the stripper member 60 rearwardly into the same position relative to the quill 56 as that shown in FIGURES 2 to 4. The pin 62 will then be again located in the upper left-hand corner of the cam-hole 61.

The quill carriage 76 continues to move rearwardly to the rearward limit position shown in FIGURE 1, at which point the cycle is recommenced.

Figure 7:
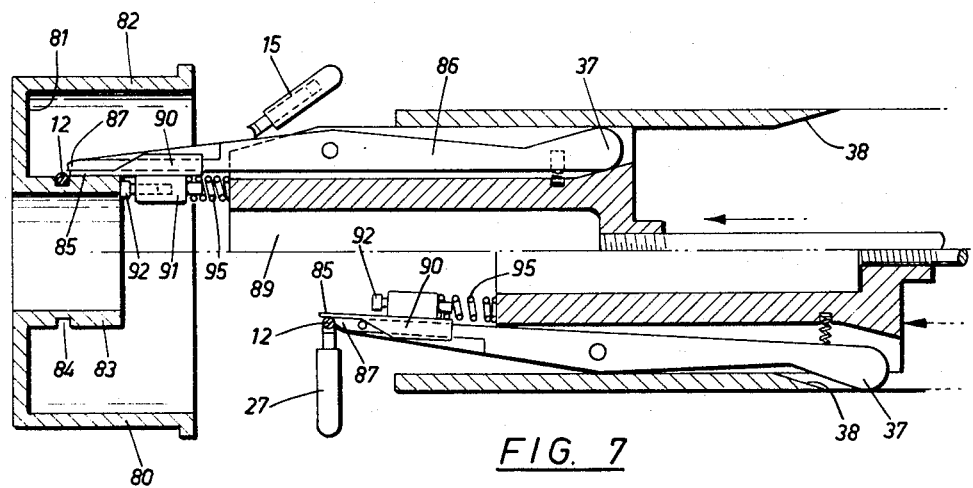
FIGURE 7 is an axial sectional view of two phases in the operation of a third embodiment of the apparatus of this invention.

Turning now to FIGURE 7, the third embodiment of this invention will be described. In this case, the part 80 to which the O-ring 12 is to be applied consists of an annular disc 81, from the outer perimeter of which rightwardly projects an outer cylinder 82, and from the inner perimeter of which rightwardly projects an inner cylinder 83 having an intermediate groove 84 in its outer surface. The O-ring 12 is intended to be lodged in the groove 84.

Although in FIGURE 7 the upper quill is shown out of alignment with the lower quill, this is merely to permit illustration of two sequential steps in the same figure. As in the first two embodiments, all of the quills, again preferably four in number, move in unison.

In this embodiment, the tip 85 is not integral with the quill 86, but is rather mounted radially inwardly of the forward portion 87 of the quill 86 for reciprocation relative thereto in substantially the same direction as movement of the quill carriage 89. The tip 85 is integral with a sleeve 90 adapted to enclose an appropriate portion of the quill 86 and to reciprocate. therealong. Upon forward movement of the quill 86, an O-ring, held between breakaway gates in the same way as in FIGURE 1, is picked up on the tips 85, carried forwardly, and spread. The sleeve 90 has attached thereto an appendage 91 adapted to abut the part 80, through the intermediary of an adjustable abutment screw 92, just prior to completion of forward movement of the quill 86. In this way, the forward movement of the tips 85 and the O-ring 12 is arrested when the O-ring 12 is just rearwardly adjacent the groove 84 in the part 80, while forward movement of the forward portion 87 of the quill 86 continues, such that the portion 87 engages the O-ring 12 and strips it from the tips 85. The quill 86 is then withdrawn as in the first two embodiments, and the tip 85 assumes once again the position shown in the bottom half of FIGURE 7, owing to the pressure of the compression coil spring 95 which biases the sleeve 90 and the tip 85 into their forward position. The rearward end 37 of the quills 86 is adapted to contact the cam surface 38 and thereby cause spreading of the quill tips 85 in the same way as in the preceding embodiments.

Although the above descriptions of the three embodiments of this invention are all described with particular relation to the placing of O-rings onto parts, it will be appreciated that the apparatus of this invention is adapted to fit any kind of resilient annulus similar to an O-ring onto an appropriately shaped object or part. Thus, the placing of small rubber tires on model vehicles would be another conceivable application of this invention. Accordingly, the appended claims refer to the apparatus in relation to a "resilient annulus."

The above three embodiments of this invention involve a design which includes four quills spaced at 90 degrees from one another. Although the preferred construction involves the use of four quills, it will be appreciated that as long as there are at least three quills, the apparatus of the invention is workable. Conversely, more than four quills might also be used. It is preferred, however, that the quills, regardless of their number, be mounted to pivot in planes intersecting along a single line, and that the dihedral angle between any pair of such adjacent planes be substantially the same as that between any other pair of adjacent planes.

While preferred embodiments of this invention have been disclosed herein, those skilled in the art will appreciate that changes and modifications may be made therein without departing from the spirit and scope of this invention, as defined in the appended claims.

What I claim as my invention is:

1. A mechanism for axially displacing a resilient annulus while radially spreading it, and for releasing the spread and displaced annulus at a pre-determined location, said mechanism comprising:

a quill carriage, guideway means along which said carriage is rectilinearly reciprocable, means for reciprocating said quill carriage, at least three quills pivotally mounted upon said quill carriage and each having a tip projecting forward of said quill carriage, the quills being biassed to bring their tips together such that, upon initial forward movement of the carriage, the tips can simultaneously enter a resilient annulus aligned axially with the direction of reciprocation, cam means between each quill and said guideway means operable upon further movement of the carriage in said forward direction to pivot the quills such that the tips are displaced radially outwardly to engage and to spread the annulus while displacing it in said forward direction, and release means actuable at the end of movement of said tips in said forward direction to strip the spread annulus from said tips.

2. A mechanism as claimed in claim 1, in which said release means comprises a stripper dog adapted to engage behind the spread annulus at the termination of forward movement of said tips, such that, as the tips begin to move rearwardly, the annulus is stripped from said tips.

3. A mechanism as claimed in claim 2, in which the stripper dog includes two depending side portions adapted to engage the resilient annulus from the rear when the resilient annulus has reached said pre-determined location, such that retraction of said tips causes the resilient annulus to be stripped from the tips.

4. A mechanism as claimed in claim 1, which is adapted to deposit the annulus on a part, said release means comprising mounting means for mounting each tip radially inwardly of a portion of the quill for reciprocation relative thereto in substantially the same direction as movement of said quill carriage, resilient means for resiliently biassing each tip forwardly towards a forward limit position in which the tip protrudes beyond said portion of the quill, each tip having secured thereto an appendage adapted to abut said part just prior to completion of forward movement, such that forward movement of the tips and of the annulus is arrested when the spread annulus is in position over the part while forward movement of said portion of the quill continues, said portion of the quill engaging the annulus and stripping it from the tips.

5. A mechanism as claimed in claim 4, in which said appendage includes an abutment screw which is adjustable forwardly and rearwardly with respect to the appendage and which is adapted to contact said part.

6. A mechanism as claimed in claim 1, in which each tip is stationary with respect to its quill, said release means comprising a stripper member mounted on each quill for axial movement with respect thereto, each stripper member being resiliently rearwardly biassed into a limit position wherein a forward portion thereof is spaced rearwardly of the forward portion of the tip and is located radially outwardly adjacent thereto, shoulder means on the stripper member, said shoulder means being adapted to engage stop means provided on said guideway means upon termination of forward movement, said stop means delaying rearward movement of the stripper member until the quill carriage has completed at least part of its rearward travel, thereby to cause said forward portion of said stripper member to engage the annulus and strip it from the tips, and a cam mechanism for disengaging said shoulder means from said stop means after the quill carriage has completed at least part of its rearward travel.

7. A mechanism as claimed in claim 6, in which said shoulder means is provided at the rearward end of said stripper member, said guideway means including a cylinder, said rearward end being resiliently biassed radially outwardly against the interior of said cylinder, said stop means being the forward end of said cylinder, said cam mechanism comprising a cam edge on said stripper member and a pin on the quill adapted to engage said cam surface.

8. A mechanism as claimed in claim 7, in which the forward end of said cylinder includes an annular collar longitudinally adjustable with respect to the cylinder, said shoulder means being adapted to engage a portion of said annular collar.

9. A mechanism as claimed in claim 7, in which the cam edge on said stripper member slopes rearwardly and radially outwardly, said cam edge being radially inwardly of said pin, such that rearward movement of said pin against said cam edge when the stripper member is stationary due to engagement of said shoulder means with said stop means forces the stripper member radially inwardly.

10. A mechanism as claimed in claim 1, in which the quills are mounted to pivot in planes intersecting along a single line, the dihedral angle between any pair of adjacent planes being the same as that between any other pair of adjacent planes.

11. A mechanism as claimed in claim 10, in which there are four quills.

12. A mechanism as claimed in claim 1, in which there is provided feed means for sequentially feeding resilient annuli into a position permitting entry and engagement by the tips.

13. A mechanism as claimed in claim 1, in which the guideway means comprises a generally cylindrical cam sleeve within which the quill carriage is reciprocable, the cam sleeve having a forwardly convergent cam surface engageable by the rearward ends of the quills during forward movement of the carriage, thereby to cause radial outward displacement of the tips during said forward movement.

14. A mechanism as claimed in claim 13, in which there are four quills spaced at 90° from each other, and in which there is provided feed means for sequentially feeding resilient annuli into a position permitting entry and engagement by the tips.

15. A mechanism as claimed in claim 14, in which said release mean comprises a stripper dog which includes two depending side portions adapted to engage the resilient annulus from the rear when the resilient annulus has reached said pre-determined location, such that retraction of said tips causes the resilient annulus to be stripped from the tips.

16. A mechanism as claimed in claim 14, which is adapted to deposit the resilient annulus on a part, said release means comprising mounting means for mounting each tip radially inwardly of a portion of the quill for reciprocation relative thereto in substantially the same direction as movement of said quill carriage, resilient means for resiliently biassing each tip forwardly towards a forward limit position in which the tip protrudes beyond said portion of the quill, each tip having secured thereto an appendage adapted to abut said part through the intermediary of an adjustable abutment screw just prior to completion of forward movement, such that forward movement of the tips and of the annulus is arrested when the spread annulus is in position over the part while forward movement of said portion of the quill continues, said portion of the quill engaging the annulus and stripping it from the tips.

17. A mechanism as claimed in claim 14, in which each tip is stationary with respect to its quill, said release means comprising a stripper member mounted on each quill for axial movement with respect thereto, each stripper member being resiliently rearwardly biassed toward a limit position wherein a forward portion thereof is spaced rearwardly of the forward portion of the tip and is located radially outwardly adjacent thereto, shoulder means on the stripper member, said shoulder means being adapted to engage stop means provided on said guideway means upon termination of forward movement, said stop means delaying rearward movement of the stripper member until the quill carriage has completed at least part of its rearward travel, thereby to cause the forward portion of said stripper member to engage the annulus and strip it from the tips, and a cam mechanism for disengaging said shoulder from said stop means after the quill carriage has completed at least part of its rearward travel, said shoulder means being provided at the rearward end of said stripper member, said rearward end being resiliently biassed radially outwardly against the interior of said cylindrical cam sleeve, said cam sleeve including, at its forward end, an annular collar longitudinally adjustable with respect to the cylinder, said shoulder means being adapted to engage stop means constituted by a forward portion of said annular collar.

18. A mechanism as claimed in claim 17, in which the cam mechanism comprises a cam edge on said stripper member and a pin on the quill adapted to engage said cam surface, said cam edge sloping rearwardly and radially outwardly and being radially inwardly of said pin, such that rearward movement of said pin against said cam edge when the stripper member is stationary due to engagement of said shoulder means with said stop means forces the stripper member radially inwardly, thereby to disengage the shoulder means from said stop means.

References Cited
FOREIGN PATENTS 620,093  3/1949  Great Britain.

ROBERT C. RIORDON, *Primary Examiner.*

J. C. PETERS, *Assistant Examiner.*